C. A. PETTIE.
NON-SKIDDING TRACTION WHEEL.
APPLICATION FILED FEB. 3, 1917.
1,251,819.
Patented Jan. 1, 1918.
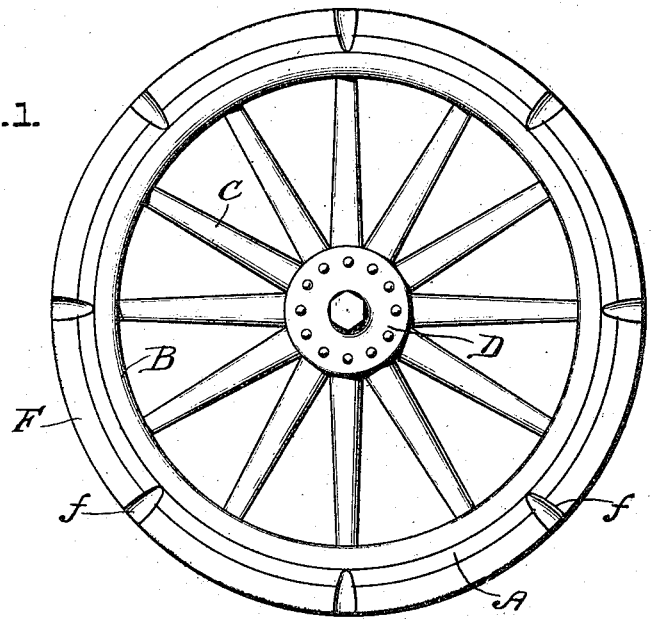
Fig. 1.
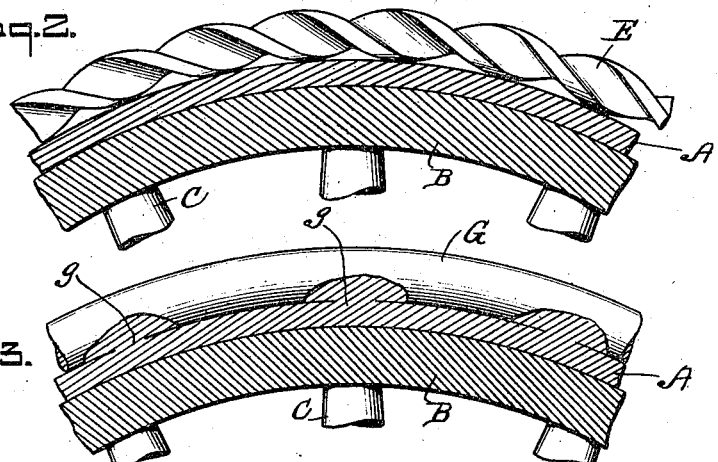
Fig. 2.
Fig. 3.
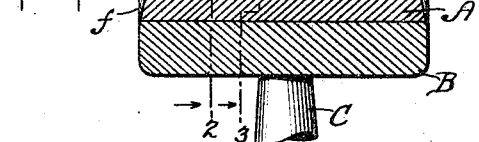
Fig. 4.
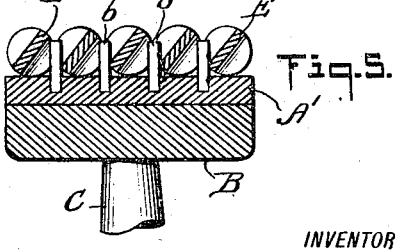
Fig. 5.
WITNESS
INVENTOR
Charles A. Pettie
BY
H. J. Bernhard
ATTORNEY

UNITED STATES PATENT OFFICE.

CHARLES A. PETTIE, OF BROOKLYN, NEW YORK.

NON-SKIDDING TRACTION-WHEEL.

1,251,819.   Specification of Letters Patent.   Patented Jan. 1, 1918.

Application filed February 3, 1917. Serial No. 146,349.

*To all whom it may concern:*

Be it known that I, CHARLES A. PETTIE, a citizen of the United States, residing at the city of New York, borough of Brooklyn, county of Kings, and State of New York, have invented a certain new and useful Non-Skidding Traction-Wheel, of which the following is a specification.

This invention is a non-skidding tread for vehicle wheels, and it pertains, more particularly, to a tread of the character mentioned adapted for use on the wheels of motor driven vehicles.

The tread of this invention constitutes a non-elastic and permanent part of the wheel, in contradistinction to the elastic tires, of either an inflatable or a solid rubber nature, or to the metal shoe, so called, used temporarily in cases of emergency upon elastic tires.

The tread is of such construction that it secures contact with a road surface in a manner to preclude, for all practical purposes, a tendency to slip upon or slide along the roadway, particularly should the latter be in a wet or a slippery condition. This capacity of the tread, and in addition thereto its capacity for picking up and retaining road material of a gritty nature, renders the tread suitable for the power driven wheel of automobiles, or of other power operated vehicles generally.

The invention consists of a plurality of members annular in form and composed of spiral or twisted material positioned adjacent each other, and constituting a rigid permanent tread surface for a vehicle wheel.

The annular members composed of twisted metal present a multiplicity of contact points for the roadway, and said annular members provide spaces between the twisted portions thereof, into which spaces sand or gritty material is adapted to be packed tightly so as to afford a surface of such nature as to secure good traction with a road surface.

For some purposes, I employ plane surface marginal members positioned exteriorly to the twisted members so as to avoid injury to the road surface, such as a pavement; and, again, all the annular members are attached by one means or another to a felly-band adapted for application to the wheel felly preliminary to the attachment of the twisted members or the marginal members.

Other features and advantages of the invention will appear from the following description taken in connection with the drawings wherein there is illustrated different constructional forms of the invention.

Figure 1 is a side elevation of my new tread applied to an ordinary vehicle wheel.

Fig. 2 is a longitudinal section illustrating a part of the tread upon a section of a rim or felly of an ordinary wheel, the plane of said section being indicated by the dotted line 2—2 of Fig. 4.

Fig. 3 is a vertical section in the plane of the dotted line 3—3 of Fig. 4 illustrating one of the separators and the method of welding said separator to the tire band.

Fig. 4 is a vertical cross section through the tread illustrated in Figs. 1, 2 and 3.

Fig. 5 is a vertical cross section of another embodiment of the invention wherein the marginal members are omitted and the annular members of twisted metal are held in spaced relation by mechanical retainers.

I will first proceed to describe that form of the invention in Figs. 1 to 4 inclusive of the drawings, wherein A designates a felly band adapted to be positioned externally upon the periphery of an ordinary rim or felly B, the latter being shown in connection with spokes C and a hub D, although it is apparent that the tread of this invention may be used on wheels of any form. Said felly band A is shown as of continuous construction adapted to be shrunk upon the felly B, but it is apparent that said band A may be attached mechanically by suitable means to the wheel rim, although I have not considered it necessary to illustrate such mechanical attachment. The felly band A consists of a piece of metal rectangular in cross section, of a width approximating the face of the wheel felly, see Fig. 4.

The salient feature of my tread consists of a plurality of members E, each composed of twisted or spiral metal, said members E being positioned side by side and secured to the felly band A. As is shown in Fig. 5, the members E composed of twisted metal may constitute the entire surface of the tread, but for certain purposes the tread consists in part of the twisted members E, marginal members F and one or more plane surfaced members G.

The member G consists of a ring which is substantially circular in cross section, said ring being positioned centrally intermediate the side edges of the felly band A. The ring G is made separate from the felly band so as to accurately fit the same, and this ring is united at intervals to the felly band, as for example, by spot welding the ring G to the felly band A, see Fig. 3, wherein the felly band is made integral by welding the same as at G at suitable intervals in the length of said ring and the band.

The marginal members F are composed of rings which are rectangular in cross section so as to provide flat exposed tread faces. The marginal members conform accurately to the external diameter of the felly band A so that said marginal members will contact snugly with the felly band, but while these marginal members F may be shrunk upon the felly band, it is preferred to spot weld the marginal members to the felly band at intervals in the length of said marginal members and the felly band. In Figs. 1 and 4, the marginal members F are shown as being spot welded at f to the felly band, the welding operation being effected by the acetylene welding operation and involving the removal of a part of the metal at the welding spots f. These marginal members are thus unitary with the felly band, and said members serve the purpose primarily of precluding the twisted metal members E from cutting into the surface of the roadway to such an extent as to result in deterioration of the road surface.

Intermediate the plane surfaced marginal members F are positioned the desired number of twisted metal rings E, it being apparent that two or more of the twisted metal rings may be employed according to the width of the wheel rim. As shown in Fig. 4, two of the twisted rings E are employed, one between the ring G and one marginal member F, and the other between said ring G and the other marginal member F. The twisted metal rings are of such cross sectional form as to bring the surfaces into substantially flush relation to the plane surfaces of ring G and marginal members F, thus presenting a tread the contour of which is irregular and is characterized by the presence of openings or spaces into which is packed sand or other gritty material so as to fill all the spaces and result in a surface composed in part of metal and in part of gritty material. This gritty material, in dry or moist weather, will pack into the spaces of the tread so as to afford such a surface on the tire as will secure the desired good frictional engagement between the tread surface and the road surface, but when the wheel is used on muddy roads, it is apparent that the mud, having a tendency to work into the spaces of the tread, will also free itself from the wheel owing to the rotation thereof.

The spirally twisted annular members E are mechanically retained in position upon the felly band A against sidewise displacement by reason of the contact between the said spirally twisted members E and the members F G, but in order to retain the spirally twisted members from rotative movement relatively to the felly band A, it is preferred to weld the members E at intervals in the length thereof to said felly band, such spot welding of the members E to the felly band being performed in the same way as the members F and G are united to the felly band as herein illustrated.

It is apparent that the rings F G are united by welding to the band A in order to retain said rings fixedly in position with respect to the band and to preclude any sidewise movement of either ring F or G relatively to the band, as well as to minimize the tendency of the rings F or G to rotate on the band. The spirally twisted rings are retained in position upon the band by the rings F and G so as to preclude the sidewise movement of the rings E with respect to the band, but, as stated, said twisted rings E may, and preferably are, welded to the band at intervals for overcoming any rotative movement upon said band.

The large number of contact points presented by the spirally twisted members E secures a good grip upon the road surface, and owing to the peculiar form of these contact edges, the wheel cannot slip upon or slide along such road surface. The tread thus has such contact with the road that the wheel will at all times roll upon such surface, but in order to preclude injury to certain kinds of pavements, it may be desirable to employ the plane surfaced rings F G in connection with the spirally twisted rings E, said plane surfaced rings operating in such manner as to prevent the twisted rings from cutting into the pavement or the road surface and enabling the wheel to ride upon car tracks or other obstructions without slipping thereon and without cutting the edges of the pavements.

In a preferred form, the wheel tread consists of a plurality of spirally twisted rings, and other rings the surfaces of which are smooth, but in certain classes of work the entire surface of the tread, exposed for contact with the roadway, may be formed exclusively by a series of spirally twisted rings as indicated in Fig. 5. According to this form of the invention, the spirally twisted rings E' are positioned adjacent each other and across the surface of the felly band A', and said rings E' are mechanically separated from contact with each other by studs or pins b, the latter being attached to or integral with the felly band A. These studs or pins operate primarily to preclude any sidewise displacement of the twisted rings upon the felly band, but it is apparent that each twisted ring may be shrunk around the felly band or may be welded at intervals thereto, all as heretofore described.

It is apparent that various changes in the details of construction and in the form and proportion of parts may be made without departing from the spirit of the invention as defined by the appended claims.

Having thus fully described the invention, what I claim as new, and desire to secure by Letters Patent is:—

1. A tread for vehicle wheels embodying a plurality of annular members each composed of twisted metal presenting a multiplicity of road contact points.

2. A tread for vehicle wheels embodying a rim band, and a plurality of annular members positioned exteriorly to said rim band, each annular member being composed of twisted metal.

3. A tread for vehicle wheels embodying a rim band, a plurality of annular members each composed of twisted metal, and marginal bands positioned at the edge portions of the rim band.

4. A tread for vehicle wheels embodying a rim band, a plurality of annular members composed of spirally twisted metal, said annular members being positioned in close relation to each other, and marginal members united to the rim band, said plurality of annular members being positioned intermediate the marginal members and the spiral material of said annular members presenting a multiplicity of road contact points or surfaces adapted for securing a grip upon the road surface.

5. A wheel tread comprising a rim band, and annular members positioned upon said rim band and each composed of twisted metal, the edge portions of which constitute a traction surface, said members being positioned relatively close and producing spaces into which is adapted to be packed material picked up from the road surface.

6. A wheel tread comprising a rim band, a plurality of annular members each composed of twisted metal, and mechanical separators for retaining the annular members from displacement relatively to said rim band.

7. A wheel tread the traction surface of which is composed of spirally twisted metal in the form of metal rings positioned in close relation to each other.

8. A wheel tread comprising metal rings each composed of spirally twisted metal, said metal rings being positioned in close relation to each other and producing intermediate spaces for the reception of a filling material.

In testimony whereof I have hereunto signed my name.

CHARLES A. PETTIE.

Copies of this patent may be obtained for five cents each, by addressing the "Commissioner of Patents, Washington, D. C."